United States Patent [19]

Muranaka et al.

[11] 4,057,256

[45] Nov. 8, 1977

[54] APPARATUS FOR DETACHABLY MOUNTING A RECORD SHEET IN PLACE IN A SHEET TYPE RECORDER/PLAYER

[75] Inventors: Masakazu Muranaka, Tokyo; Saburo Kato, Yokohama, both of Japan

[73] Assignee: Ricoh Co., Ltd., Japan

[21] Appl. No.: 686,682

[22] Filed: May 17, 1976

[30] Foreign Application Priority Data

May 17, 1975 Japan .................................. 50-58967

[51] Int. Cl.² ............................................... G11B 3/10
[52] U.S. Cl. ..................................... 274/9 C; 360/101
[58] Field of Search ................... 360/2, 101; 274/9 C, 274/13 R

[56] References Cited

U.S. PATENT DOCUMENTS

| | | | |
|---|---|---|---|
| 3,074,724 | 1/1963 | Fujimoto | 360/101 |
| 3,214,175 | 10/1965 | Nakamatsu | 360/101 |
| 3,811,686 | 5/1974 | Watanabe | 274/9 C |
| 3,931,640 | 1/1976 | Takahara et al. | 360/2 |

*Primary Examiner*—Richard E. Aegerter
*Assistant Examiner*—John W. Shepperd

*Attorney, Agent, or Firm*—McGlew and Tuttle

[57] ABSTRACT

A device for the accurate placement of a record sheet having a plurality of positioning holes, and recording area on a recorder-player having a recording-playing head and placement pins engageable with the placement holes of the record sheet, comprises a bottom placement plate having an indented area substantially corresponding to the shape of the record sheet, an opening in the indented area corresponding to the shape of the recording surface of the record sheet, and a plurality of apertures corresponding to the placement holes of the record sheet and a covering retainer plate having a plurality of apertures corresponding to the holes of the record sheet and the apertures of the placement plate. The placement plate and retainer plate form a pocket into which a record sheet is insertable for coarse alignment with the placement pins of the recorder-player. The pocket assembly is displaceable toward the recorder-player to bring the record sheet into engagement with the placement pins which are beveled to further align the recording surface with the recording-playing head of the recorder-player.

4 Claims, 15 Drawing Figures

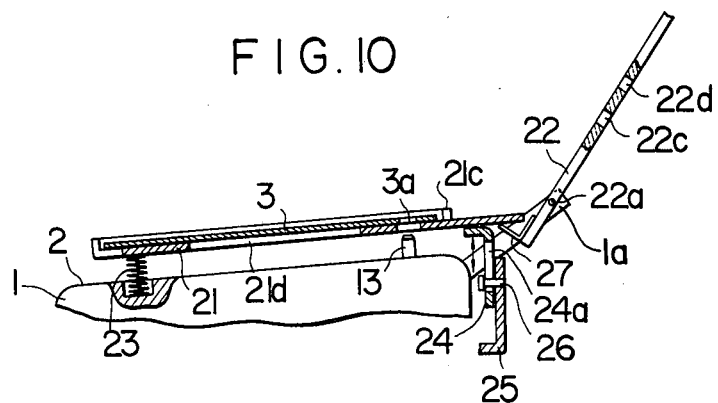
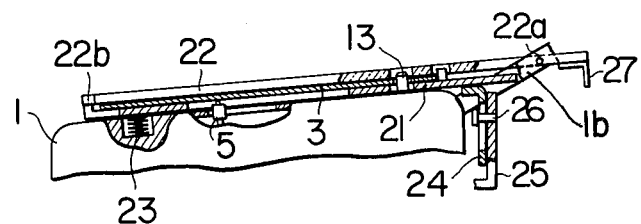
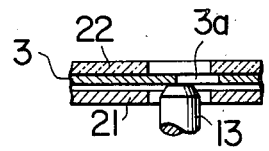
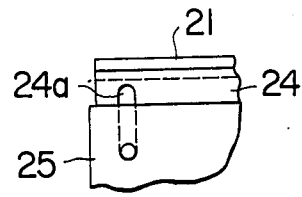
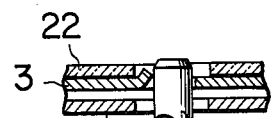
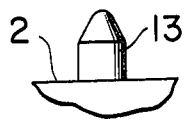

APPARATUS FOR DETACHABLY MOUNTING A RECORD SHEET IN PLACE IN A SHEET TYPE RECORDER/PLAYER

FIELD AND BACKGROUND OF THE INVENTION

This invention relates in general to sheet recorder-players and, in particular, to a new and useful device for accurately aligning the recording surface of a record sheet with the recording-playing head of the recorder-player.

DESCRIPTION OF THE PRIOR ART

In known sheet recorder/players, a record sheet is disposed at a given position, and a recording or playing head is maintained in contact with the sheet. The head is rotated in a spiral path on the recording surface of the sheet for performing a record or playback operation. Specifically, one example of such a recorder/player is shown in FIG. 1, wherein the recorder/player includes a casing 1 having a top plate 2 on which a record sheet 3 is located in a given position. The correct positioning of the record sheet 3 is achieved by using three sheet locating pins 4 of a relatively short length, which are disposed on the top of plate 2. A recording or playing head 5 is carried by and rotates with a panel 6 which is substantially integral with a turntable, not shown, and the head is adapted to be moved toward the center of the turntable along a groove 7 which is radially cut into the panel 6. A retaining plate 8 is hinged along one lateral side of the casing, and is adapted to cover the record sheet 3 when the above mentioned record or playback operation is to be performed.

The record sheet is loaded by placing it over the plate 2 with its aperture 3a aligned in locating pins 4, as shown in FIG. 2. Retaining plate 8 is then closed to cover the sheet as indicated in FIG. 3. A reverse procedure is employed when removing the record sheet. It should be noted that during such removal, any excessive amount of force applied to the record sheet 3 may result in damage to the apertures. The apertures also may be abraded each time the sheet is placed or removed thereby increasing the size of the apertures, and gradually resulting in misalignment of the track. When misaligned, the record sheet is no longer usable. This results, particularly, when the sheet is made of a soft material such as paper. In any event, it is troublesome to remove the very thin sheet by pinching it with fingers, and such an operation will unavoidably cause an excessive amount of force on the sheet, causing breakage or abrasion of the pin apertures. In addition, placement or removal of the sheet and opening or closing of the retaining plate represent an awkward operation, and it is desirable if such a procedure can be achieved in one operation.

SUMMARY OF THE INVENTION

The present invention provides a record sheet placement device in which the disadvantages of the prior art are avoided. The record sheet is inserted into a placement pocket formed by a bottom placement plate and a covering retaining plate. The sheet is held in coarse alignment with the placement pins of a recorder-player and the entire assembly is lowered onto the recorder-player.

An object of the invention is to eliminate the damaging effects of the prior art placement of the record sheets.

A further object of the invention is to provide a record sheet placement device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the drawing:

FIG. 10 is a side elevation, partly in section, of a further embodiment of the invention;

FIG. 11 is a fragmentary side elevation of the embodiment shown in FIG. 10;

FIG. 12 is a view similar to that shown in FIG. 10 when the sheet is loaded;

FIG. 13 is a side elevation, partly in section, illustrating a sheet riding over a sheet locating pin;

FIG. 14 is a side elevation, partly in section, illustrating an undesirable effect from the condition shown in FIG. 13; and FIG. 15 is a side elevation of an exemplary form of sheet locating pin.

DETAILED DESCRIPTION OF THE PREFERRED EMBODIMENTS

Figure 1:
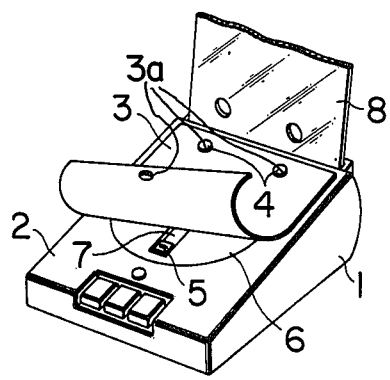
FIG. 1 is a perspective view of an exemplary sheet type recorder/player to which the invention can be applied.
Figure 4:
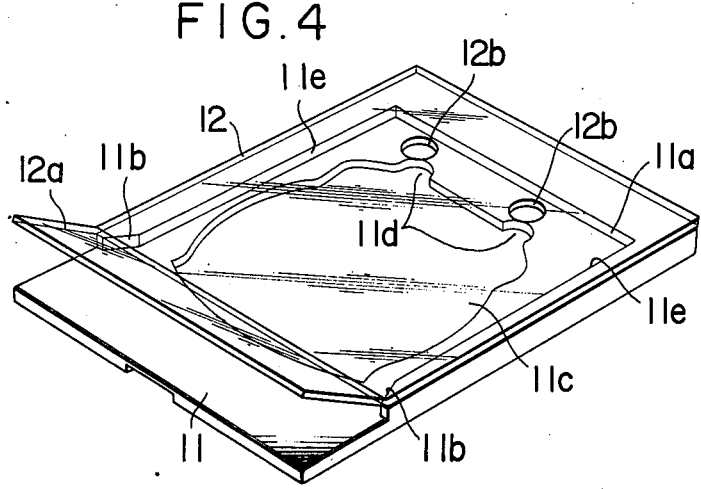
FIG. 4 is a perspective view of a sheet placement plate and a sheet retaining plate which are constructed in accordance with one embodiment of the invention.
Figure 5:
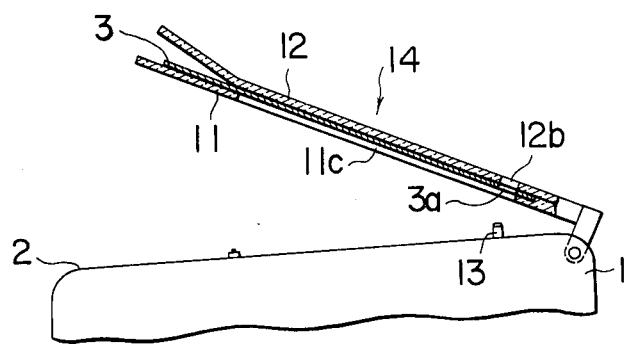
FIG. 5 is a side elevation, plartly in section, of one embodiment of the invention.
Figure 6:
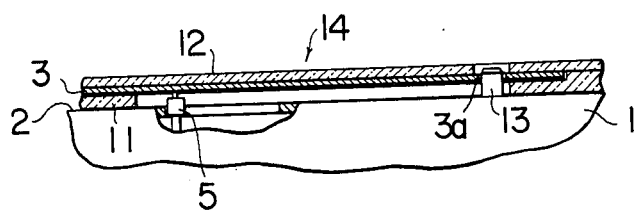
FIG. 6 is a fragmentary side elevation, partly in section, of the embodiment shown in FIG. 5, illustrating a sheet loaded.

Referring to the drawings in particular, the invention embodied therein in FIG. 4, comprises a placement device having a sheet placement plate 11 which is formed with marginal edge frames 11a, 11b of a height slightly greater than the thickness of a record sheet, along one end edge and along both lateral edges thereof. Inner end faces 11e of the opposite marginal edge frames 11b are spaced by a distance slightly greater than the width of a record sheet. The plate 11 is formed with a central head receiving opening 11c of a size sufficient to prevent interference with the spiral motion of the recording or playing head 5 (see FIG. 1), and is also formed with a pair of pin apertures 11d adjacent to and communicating with the opening 11c. These apertures are adapted to receive two sheet locating or placement pins 13 in FIG. 5. A transparent sheet retaining plate 12 is disposed on and secured to the upper surface of the marginal edge frames 11a, 11b of the sheet placement plate 11, thus forming a pocket into which a record sheet is insertable. At its one end, the sheet retaining plate 12 is formed with an upwardly inclined extension 12a which facilitates the access of the sheet into or out of the pocket. In addition, the plate 12 is formed with a pair of pin apertures 12b in the region of the pin apertures 11d formed in the plate 11. As shown in FIG. 5, the end of plate 11 on which the marginal edge frame 11a is formed, is hinged to one side of the casing 1 to form a mounting between plate 11 and the recorder. The plate 11 is mounted so that the pin apertures 3a formed in the record sheet are located in substantial alignment with two of the sheet locating pins 13 provided on the top plate 2 of the casing, the top edge of the loaded sheet 3 bears against the marginal edge frame 11a (see FIG. 4).

Figure 2:
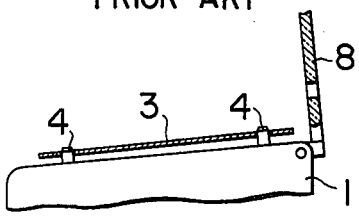
FIGS. 2 and 3 are side elevations, partly in section, illustrating a conventional sheet loading operation.
Figure 3:
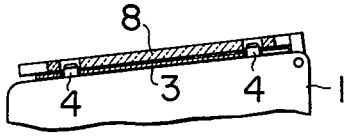
Figure 7:
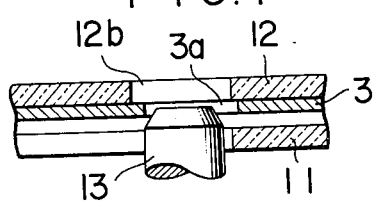
FIG. 7 is a cross section illustrating a pin aperture formed in a record sheet which is engaged by a sheet locating pin.
Figure 8:
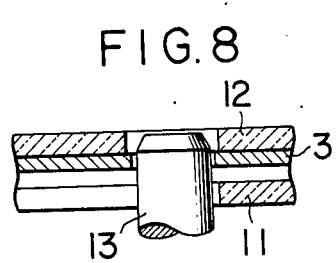
FIG. 8 is a side elevation, partly in section, illustrating a pin aperture formed in the sheet into which a sheet locating pin is seated.

To perform a record/playback operation, the sheet 3 is inserted into the pocket formed by the plates 11 and 12, generally designated 14, until the top edge of the sheet bears against the marginal edge frame 11a, as shown in FIG. 5. In this manner, a coarse alignment of the sheet with the locating pins 13 is achieved. When the pocket 14 is closed against the top plate 2, as shown in FIG. 2. The sheet locating pins 13 are engaged into the pin apertures 3a in the sheet, whereby the sheet 3 is retained in a given position relative to the magnetic head 5. FIGS. 7 and 8 illustrate the manner of correcting the position of the sheet as the pocket 14 is closed. In order to replace a sheet upon completion of a record/playback operation, it is necessary to open the pocket 14 and, pull out the sheet 3 directly, thus allowing the loading and removal of the sheet to be achieved in one operation.

Figure 9:
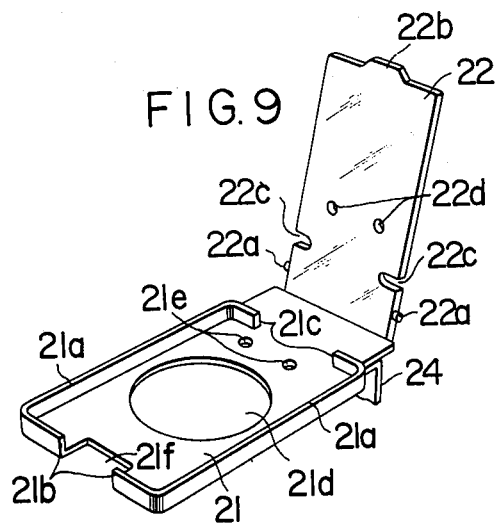
FIG. 9 is a perspective view of a sheet placement plate and a sheet retaining sheet which are constructed in accordance with another embodiment of the invention.

FIG. 9 shows another embodiment of the invention in which the apparatus for detachably mounting a record sheet comprises a sheet placement plate 21. The top portion of the plate 21 is in the form of a box which is formed by marginal edge frames 21a, 21b and 21c and into which a sheet is loosely received. A notch 21f is formed in the middle portion of the marginal edge frame 21b and extends into an adjacent portion of the plate 21. Similarly, the middle portion of the marginal edge frame 21c is removed. As before, the plate 21 is formed with a central head receiving opening 21d, and has a pair of pin apertures 21e near the marginal edge frame 21c. These marginal edge frames are disposed so that the sheet 3, which is placed on the plate 21 within the area defined by these edge frames, has its pin apertures 3a (see FIG. 10) positioned in substantial alignment with the sheet locating pins 13 and the apertures 21e.

Referring to FIGS. 9 and 10, a sheet retaining plate 22 made of transparent material is provided over the placement plate 21. Retaining plate 22 is pivotally mounted on portions 1a and 1b of casing 1 by a pair of pivots 22a. Plate 22 may be locked in an open position. At one end, the plate 22 is formed with a hand grip 22b for manually opening or closing it. It also has a pair of notches 22c which are adapted to loosely receive the opposing ends of the marginal edge frame 21c. In addition, the plate 22 has with a pair of pin apertures 22d at positions corresponding to the pin apertures 21e formed in the sheet placement plate 21.

As best seen in FIG. 10, the mounting of the record sheet is achieved as follows; a tension spring 23 has one end secured to the lower surface of the sheet placement plate 21 adjacent notch 21f (see FIG. 9), and has its other end secured to the casing 1. The sheet placement plate 21 extends beyond the marginal edge frame 21c, and an L-shaped sliding member 24 is secured to the lower surface of this such extension. As shown in FIG. 11, the sliding member 24 has a pair of elongate slots 24a in its left- and right-hand portions (the slot 24a in the right-hand side is not shown). A holder 25 is fixed to the casing 1 and carries a pair of alignment pins 26 which fit into the slot 24a in the sliding member 24, thus allowing the member 24 to be moved vertically together with the sheet placement plate 21.

A hook-profiled abutment member 27 is mounted on the sheet retaining plate 22. Member 27 serves to retain plate 21 away from the top plate 2 when the retaining plate 22 is in its open position by bearing against the extension of the sheet placement plate 21 and cooperating with the spring 23. The spring 23 has a relatively weak resilience so that the sheet placement plate 21 is dropped into abutment against the top plate 2 by virtue of its own weight when the sheet retaining plate 22 is closed.

In operation, a record sheet 3 is placed on the sheet placement plate 21, as shown in FIG. 10. In this position, the sheet 3 is located in coarse alignment with the sheet locating pins 13. Subsequently, the sheet retaining plate 22 is closed as shown in FIG. 12, whereupon gravity causes the sheet placement plate 21 to drop against the resilience of the spring 23, thereby fitting the locating pins 13 into the apertures 3a formed in the sheet 3 and complete a correct positioning of the sheet relative the record head 5. Upon completion of a record/playback operation, the sheet retaining plate 22 may be opened. The resilience of the spring 23 and the raising action of the abutment member 27 causes the sheet placement plate 21 to be moved away from the top plate 2 and returns to its original position. The sheet 3 may now be removed. In this manner, the loading and removal of the record sheet is facilitated. In addition, since the sheet placement plate 21 is movable in the vertical direction relative the plane of the top plate 2, damage will not be caused to the pin apertures 3a formed in the sheet 3 and assuring a smooth positioning of the sheet is assured. FIG. 13 illustrates a difficulty which may result if the sheet retaining plate 22 is closed when the holes 3a of sheet 3 are poorly aligned with the locating pins 13. Pins 13 may distort or break a portion of the holes 3a in the sheet. Such difficulty can be avoided by providing a cup-shaped top end for the locating pins 13 as illustrated in FIG. 15.

While specific embodiments of the invention have been shown and described in detail to illustrate the application of the principles of the invention, it will be understood that the invention may be embodied otherwise without departing from such principles.

What is claimed is:

1. A device for accurately positioning a record sheet having a plurality of positioning holes, comprising a recorder/player having a playing head movable in a predetermined path in contact with the record sheet, a plurality of positioning pins fixed to the top of said recorder/player alignable in the positioning holes of the record sheet, a placement plate movably mounted on said recorder having a marginal edge defined thereon and having a playing head receiving opening in said marginal edge and a plurality of first positioning pin receiving apertures in the marginal edge alignable with said positioning pins, mounting means connected between said placement plate and said recorder/player to move said placement plate, a retaining plate disposable over said placement plate and pivotally mounted to said recorder/player, having a second plurality of positioning pin receiving apertures alignable with said positioning pins, wherein said pivotally mounted retaining plate is pivotable from a first position away from said placement pins of said recorder/player to a second position toward said recorder/player for engaging said second pin receiving apertures on said placement pins, an abutment connected to said retaining plate adjacent one end of said placement plate for lifting said placement plate away from said recorder/player at that end, a spring between said placement plate and said recorder/player for biasing said placement plate away from said recorder/player when said retaining plate is in said first position, alignment means on said placement plate adjacent said abutment on said retaining plate for maintaining said first pin receiving apertures in alignment with said positioning pins while said retaining plate is moved from said first position to said second position.

2. A device according to claim 1, wherein said aligning means further comprises an L-shape sliding member connected to said placement plate adjacent said abutment of said retaining plate having at least one elongated slot therein, and at least one alignment pin connected to a fixed portion of said recorder/player slidable in said elongated slot for aligning said first apertures of said placement plate with said placement pins of said recorder/player.

3. An apparatus for detachably mounting a record sheet in place in a sheet type recording/playing machine in which the record sheet is positioned by engagement between a plurality of positioning pins attached to a sheet mounting plate of the casing of the machine and corresponding apertures formed in the record sheet and the under surface of the positioned sheet is scanned for recording/playing by movable head means, said apparatus comprising:
  a. a sheet placement plate movable between a first position in which it rests on the sheet mounting plate and a second position in which it is spaced from the mounting plate, said placement plate housing;
    i. marginal edge positioning means provided on its surface for coarsely positioning a record sheet on said placement plate.
    ii. apertures for permitting the positioning pins to freely pass therethrough when said placement plate is in the first position, and
    iii. an opening for providing access to the undersurface of the record sheet on said placement plate in the first position, by the head means,
  b. mounting means connected between said placement plate and the casing for moving said placement plate;
  c. a sheet retaining plate means pivotally mounting said sheet retaining plate on the casing for movement between an open position away from said placement plate to a closed position in which the record sheet on said placement plate in the first position is held down thereby, said retaining plate having apertures for permitting the positioning pins to freely pass therethrough when in the closed position, wherein said mounting means further comprises means for resiliently urging said placement plate toward its second position such that the retaining plate can depress the placement plate into the first position against the resilient force of said urging means by said retaining plates own weight when it closes on said placement plate to assume its closed position.

4. An apparatus according to claim 3, wherein said mounting means further comprises guide means for guiding the movement of said placement plate beteeen the first and the second position and said retaining plate having abutment means attached thereto for engaging with the underside of said placement plate, to move it to the second position when said retaining, plate is brought into the open position.

* * * * *